US008036473B1

(12) United States Patent
Ratto et al.

(10) Patent No.: US 8,036,473 B1
(45) Date of Patent: Oct. 11, 2011

(54) PIXEL SELECTIVE WAVELET TRANSFORM METHODS

(75) Inventors: Patrick Ratto, Burnaby (CA); David Victor Hobbs, Surrey (CA); Debra Dorey, legal representative, Burnaby (CA)

(73) Assignee: Teradici Corporation (CA)

(*) Notice: Subject to any disclaimer, the term of this patent is extended or adjusted under 35 U.S.C. 154(b) by 0 days.

(21) Appl. No.: 12/882,010

(22) Filed: Sep. 14, 2010

Related U.S. Application Data

(63) Continuation of application No. 11/624,166, filed on Jan. 17, 2007, now abandoned.

(60) Provisional application No. 60/759,708, filed on Jan. 17, 2006.

(51) Int. Cl.
*G06K 9/36* (2006.01)

(52) U.S. Cl. ........................ 382/232; 382/240
(58) Field of Classification Search .................. 382/232
See application file for complete search history.

(56) References Cited

U.S. PATENT DOCUMENTS

| 5,764,807 | A | 6/1998 | Pearlman et al. |
| 5,838,377 | A | 11/1998 | Greene |
| 6,148,110 | A | 11/2000 | Yajima et al. |
| 6,148,354 | A | 11/2000 | Ban et al. |
| 6,236,684 | B1 | 5/2001 | Wu |
| 6,459,814 | B1* | 10/2002 | Li et al. .................. 382/240 |
| 6,510,251 | B1 | 1/2003 | Shirouzu et al. |
| 6,549,674 | B1 | 4/2003 | Chui et al. |
| 6,701,012 | B1 | 3/2004 | Matthews |
| 2003/0133617 | A1 | 7/2003 | Mukherjee |
| 2003/0185454 | A1 | 10/2003 | Simard et al. |
| 2003/0202697 | A1 | 10/2003 | Simard et al. |
| 2005/0058358 | A1* | 3/2005 | Zbiciak et al. ............. 382/240 |

OTHER PUBLICATIONS

Bottou, Leon et al., "Lossy Compression of Partially Masked Still Images", first presented in Proceedings of the Conference on Data Compression, (DCC '01), Mar. 30-Apr. 1, 1998, p. 528, in Snowbird, Utah, USA, this version Apr. 3, 1998, 10 pages, IEEE, New York, NY, USA.

Herley, Cormac, "Boundary Filters for Finite-Length Signals and Time-Varying Filter Banks", to appear in 1994 IEEE International Symposium on Circuits and Systems, ISCAS 1994, London, England, UK, May 30-Jun. 2, 1994, pp. 637-640, this version Mar. 24, 1994, 35 pages, IEEE, New York, NY, USA.

Li, Shipeng et al., "Shape-Adaptive Discrete Wavelet Transforms for Arbitrarily Shaped Visual Object Coding", IEEE Transactions on Circuits and Systems for Video Technology, Aug. 2000, vol. 10, Issue 5, pp. 725-743, this version 28 pages, IEEE, New York, NY, USA.

(Continued)

*Primary Examiner* — Samir Ahmed
*Assistant Examiner* — Ruiping Li
(74) *Attorney, Agent, or Firm* — Lewis and Roca LLP

(57) ABSTRACT

A method of transforming and sending data, comprising: receiving an image with an associated mask; transforming the received image; quantizing the transformed image; encoding the quantized image and associated mask; and transmitting the encoded image and mask; wherein transforming the received image comprises transforming the dimension subset by repeating steps of: preparing an input vector; determining a filter type; determining a first intermediate vector; determining a second intermediate vector; computing a transform vector from the sum of the first intermediate vector and the second intermediate vector; and computing an output value from the input vector and the computed transform vector.

11 Claims, 8 Drawing Sheets

OTHER PUBLICATIONS

Lawson, S. et al., "Image Compression Using Wavelets and JPEG2000: a Tutorial", Electronics & Communication Engineering Journal, Jun. 2002, pp. 112-121.

Simard, Patrice Y. et al., "A Wavelet Coder for Masked Images", Proceedings of the Conference on Data Compression, (DCC '01), Mar. 30-Apr. 1, 1998, pp. 93-102, this version 10 pages, in Snowbird, Utah, USA, IEEE, New York, NY, USA.

Examiner is notified of office communication (Mail date Nov. 24, 2010) associated with co-pending U.S. Appl. No. 11/771,797 entitled "Group Encoding of Wavelet Precision" filed Jun. 29, 2007 in which US Patent 5,764,807 A; dated Jun. 1998.

Examiner is notified of office communication (Mail date Mar. 2, 2010) associated with co-pending U.S. Appl. No. 11/624,166 entitled "Pixel Selective Wavelet Transform Methods" filed Jan. 17, 2007.

Examiner is notified of final office communication (Mail date Sep. 1, 2010) associated with co-pending U.S. Appl. No. 11/624,166 entitled "Pixel Selective Wavelet Transform Methods" filed Jan. 17, 2007.

* cited by examiner

Encode Method

Decode Method

'Transform'

Transform 1D Sub-set

PIXEL SELECTIVE WAVELET TRANSFORM METHODS

CROSS-REFERENCE TO RELATED APPLICATIONS

This application is a continuation of co-pending U.S. patent application Ser. No. 11/624,166, filed Jan. 17, 2007, which claims priority to U.S. Provisional Patent Application Ser. No. 60/759,708, filed Jan. 17, 2006, the entirety of which are hereby incorporated by reference herein.

FIELD

The present invention relates generally to apparatus and methods for transforming and encoding masked data sets. More particularity, the invention relates to apparatus and methods for constructing decomposition filters and applying a wavelet transform to a two-dimensional image data set covered by a binary mask prior to encoding and transmission.

BACKGROUND

Efficient transmission of a composite digital image may be accomplished by decomposing the image into different layers with different characteristics and then encoding each layer using a different method. As one example, an image may be separated into text and background layers that are then independently transformed and encoded.

One method of decomposing an image involves masking out the unwanted elements associated with a layer using a binary mask and transforming the remaining elements so that the masked elements do not need to be transmitted. Both the Discrete Cosine Transform (DCT) and the Discrete Wavelet Transform (DWT) have been adapted to support the transformation of arbitrarily-shaped images covered by a binary mask. However, the DWT generally result in higher image quality once an image has been decoded.

When wavelets are located entirely under a mask, coefficients resulting from a DWT transform may be set to zero or skipped during the coding process and the image may still be fully recovered at a remote system. In this case, the shape-adaptive DWT (SA-DWT) method enables the transform of an arbitrarily-shaped contiguous region that preserves self-similarity across sub-bands and the number of pixels in the original shape.

However in many image types, especially images comprising text, the image area is only partially masked. This includes image areas associated with the smallest scale wavelet. In these situations, partially masked wavelet coefficients cannot simply be cancelled or skipped as this will affect the unmasked pixel values in the recovered image. Rather, the input image or transformed coefficients are adjusted to compensate for the masked pixels.

One approach involves filling masked areas of the image with hallucinated data such as the average value of adjacent pixels. However, hallucination methods increase the image size by adding more data. They also introduce discontinuities at the mask boundaries that blurs the output image.

Another method involves adjusting the masked coefficients by calculating a code efficient interpolation of visible pixels using methods such as Projection Onto Convex Sets (POCS). POCS generates a set of transform solutions and a sequence of data comparisons to determine the optimum transform. This method involves high computational effort. For example, the Déjà vu system was documented to takes 15 seconds on an SGI workstation. This high computation effort is inappropriate for real time image processing applications such as compression of image frames comprising rapidly-changing content.

Another approach is mask-dependent lifting. In this method, the availability of pixels for an input image as limited by the mask is evaluated. An appropriate polynomial wavelet function is then derived on a case-by-case basis and a linear combination of available unmasked neighboring pixels for both prediction and update steps of the lifting process is generated. When the lifting method is used for masked sets, the update coefficients are derived from modified predicted coefficients. A problem with this approach is that modified update values are used for each subsequent pass of the wavelet transform that increases the uncertainty in the low frequency components as the transform progresses.

In summary, existing methods for transforming partially masked images are not optimized to address requirements necessary for efficient transformation of high-accuracy real-time images.

SUMMARY OF THE INVENTION

The described system and methods provide transformation and encoding of partially masked image data in preparation for transmission to a remote system.

Low- and high-pass wavelet decomposition filters are applied to data blocks during a forward masked transform that requires minimal processing overhead. The decomposed image data is then quantized, encoded and transmitted with an encoded mask.

In an embodiment, transform filters are constructed that have filter characteristics dependent on the number of sequentially unmasked values in either direction from a focus value in a determined processing orientation.

In another embodiment, the input data is shuffled to maximize the significance of higher order low frequency wavelet coefficients. Specifically, an input value associated with a low frequency sub-band is substituted with neighboring unmasked input value to preserve the contribution of the unmasked input value to the next level of decomposition.

In summary, the described invention provides improved methods for transforming masked data sets, resulting in high accuracy transformations optimized to match the requirements of real time image processing and compression.

Other features and advantages of the present invention will become apparent from reading the following detailed description, when considered in conjunction with the accompanying drawings, in which:

DETAILED DESCRIPTION OF THE DRAWINGS

In the following detailed description of the present invention, methods and apparatus for encoding masked images, numerous specific details are set forth to provide a more thorough description of embodiments of the invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
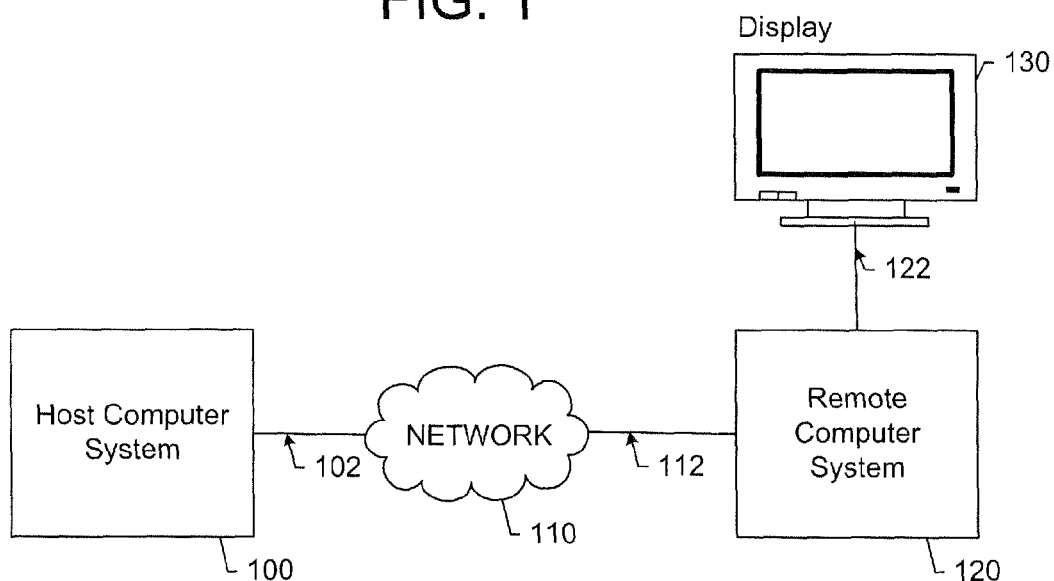
FIG. 1 presents an embodiment of a system for encoding, transmitting, decoding and displaying dynamic composite images.

FIG. 1 presents an embodiment of a system for encoding, transmitting, decoding and displaying dynamic composite images such as a continuous stream of computer display images comprising video with text overlay, scrolling text in a graphical word processing environment or other changing composite display information. In this specification, a composite image is defined as an image suitable for decomposition based on image type information or pixel status information. In an embodiment an image is decomposed into different image types such as background, text, picture, video or object layers based on spatial and temporal features such as contrast, color content or other suitable parameters. In another embodiment, an image is decomposed into different layers based on pixel update status. In such an embodiment, a pixel that has been processed, for example, encoded and transmitted, is covered by a mask until it changes value to prevent retransmission of redundant information. In another embodiment, an image is decomposed based on image type and pixel update status.

In an embodiment, host computer system 100 in FIG. 1 is implemented as a computer system incorporating an image encoder. In one embodiment, computer system 100 is implemented as a client blade PC architecture. In another embodiment, computer system 100 is implemented with a computer server architecture. Other embodiments include any computer system suited to the image encoding methods described herein.

Computer system 100 is connected to network 110 by connection 102. Network 110 provides communications between host and remote computer systems. In one embodiment, network 110 is a wire-line network using Internet Protocol (IP) deployed as a local area network (LAN) as may be used in a corporate environment. In another embodiment, network 110 is a wireless network. In another embodiment, network 110 is a wide area network (WAN) as may be used to connect an Internet service provider (ISP) to residential subscribers.

Remote computer system 120 is connected to network 110 by connection 112 shown. Computer system 120 is also connected to display 130 by display connection 122. In an embodiment, connection 122 is a digital visual interface (DVI) connection but other embodiments use different display connections such digital packet video link (DPVL), video graphics array (VGA), DisplayPort™, Net2Display™ or other suitable display connections. In an embodiment where computer system 120 is configured as a remote desktop, peripheral devices typical of a desktop computer such as mouse, keyboard and others not shown in FIG. 1 may also be present. An embodiment of remote computer system is described herein and illustrated in FIG. 3.

Display 130 is a display such as a liquid crystal display (LCD) or cathode ray tube (CRT) display. In one DVI embodiment, display 130 is an SXGA supporting a resolution of 1280×1024. Other examples include but are not limited to VGA, HDTV, UXGA, QXGA, WXGA and WQXGA embodiments.

In an alternative embodiment to the system shown in FIG. 1, computer system 100 is communicatively coupled to a mass storage system and the encoded information generated by the described encoding methods is transmitted to memory rather than across network 110 as shown in FIG. 1. In such an alternative embodiment, computer system 100 or another computer system retrieves encoded image information from the mass storage system and applies the decoding methods described. It is contemplated that other embodiments exist where it is desirable to encode and decode composite images as defined herein.

Figure 2:
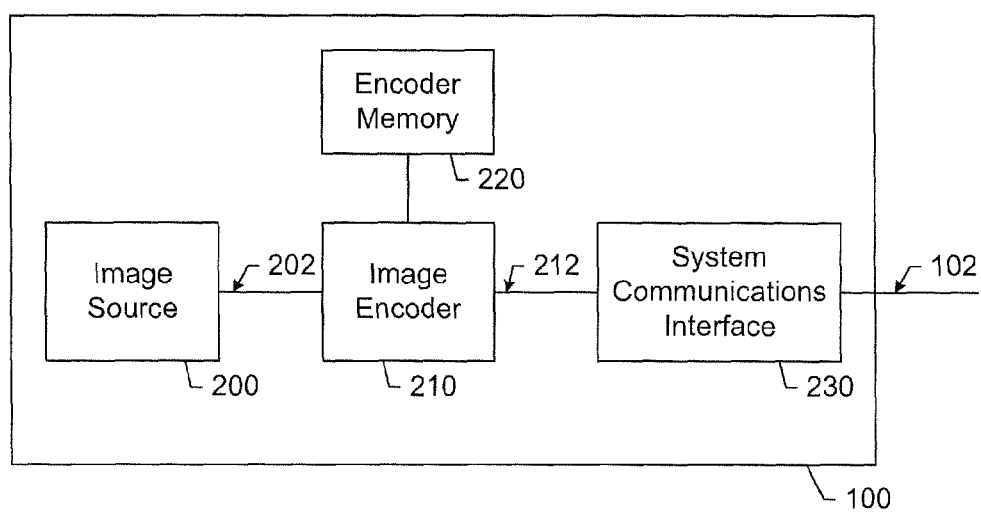
FIG. 2 shows an embodiment of a host computer system suitable for image transform and encoding.

FIG. 2 shows an embodiment of host computer system 100 suitable for transforming and encoding composite images using methods described by the present invention. In the embodiment shown, image source 200 is communicatively coupled with image encoder 210 by bus 202. In an embodiment, image source 200 is a CPU sub-system capable of generating images. An embodiment of a CPU image source is described herein and illustrated in FIG. 3. In another embodiment, image source 200 is an interface for receiving uncompressed image data such as a mass storage interface, camera interface, network interface or other suitable interface.

Bus 202 can be, for example but not limited to, one or more buses such as a DVI bus, a peripheral component interconnect (PCI) bus, a PCI-Express™ bus a HyperTransport™ bus, an Advanced Microprocessor Bus Architecture (AMBA®) bus or other wired connections, as is known in the art. Bus 202 may have additional elements, such as controllers, data buffers, drivers, repeaters, and receivers, to enable communications but are omitted from FIG. 2 for simplicity. Further, bus 202 may include address, control, and/or data connections to enable appropriate communications among the aforementioned components. In one embodiment, bus 202 is an aggregation of different buses, such as aggregation of a DVI bus that communicates image data and a PCI-Express bus that communicates drawing information to encoder 210.

Figure 5:
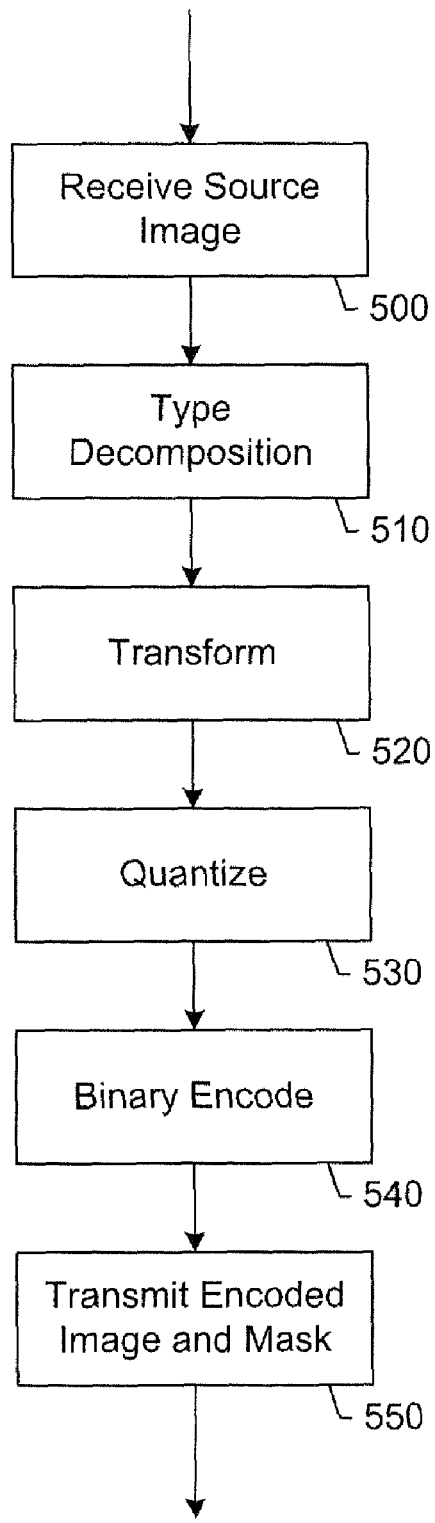
FIG. 5 shows an embodiment of a method for encoding and transmitting composite images using partially masked wavelet transforms

Image encoder 210 executes image-encoding operations such as image type decomposition, transform, quantization and binary encoding described further in FIG. 5. In an embodiment, encoder 210 is a programmable embedded digital media processor such as a TMS320DM64x DaVinci™ digital media processor available from Texas Instruments, a PNX1300 Nexperia™ processor from Philips, or other functionally similar processor suitable for performing the encoding methods described herein and illustrated in FIG. 5. In another embodiment, encoder 210 is implemented as a Field Programmable Gate Array (FPGA) or Application Specific Integrated Circuit (ASIC) configured as a logic circuit to execute the methods shown in FIG. 5.

Encoder memory 220 stores image and mask information related to intermediate encoding steps described later. In an embodiment, encoder memory 220 is connected directly to encoder 210. In an alternative embodiment, encoder 210 shares memory resources associated with image source 200, for example system memory or drawing memory. In one embodiment, memory 220 is Dynamic Random Access Memory (DRAM) such as synchronous DRAM.

In the embodiment shown in FIG. 2, system communications interface 230 is connected to encoder 210 by bus 212. Bus 212 can be, for example but not limited to, one or more buses such as a PCI bus, a PCI-Express™ bus, an AMBA bus or other wired connection, as is known in the art. Bus 202 may also have additional elements to enable communications but are omitted from FIG. 2 for simplicity.

Systems communications interface 230 provides communication coupling with an external transport system such as network 110 in FIG. 1. Interface 230 sends and receives electrical, electromagnetic or optical signals that carry digital data streams representing various types of information. In an embodiment, interface 230 is a network interface that supports protocol stacks for network communications such as TCP/IP and provides network connection 102. In another embodiment, communications interface 230 is a storage system interface such as a fibre channel, small computer system interface (SCSI), universal serial bus (USB), Firewire™, serial advanced technology attachment (SATA) or other storage system interface.

Host computer system 100 described above is for purposes of example only. An embodiment of the present invention may be implemented in any type of computer system or programming or processing environment with image encoding capabilities.

Figure 3:
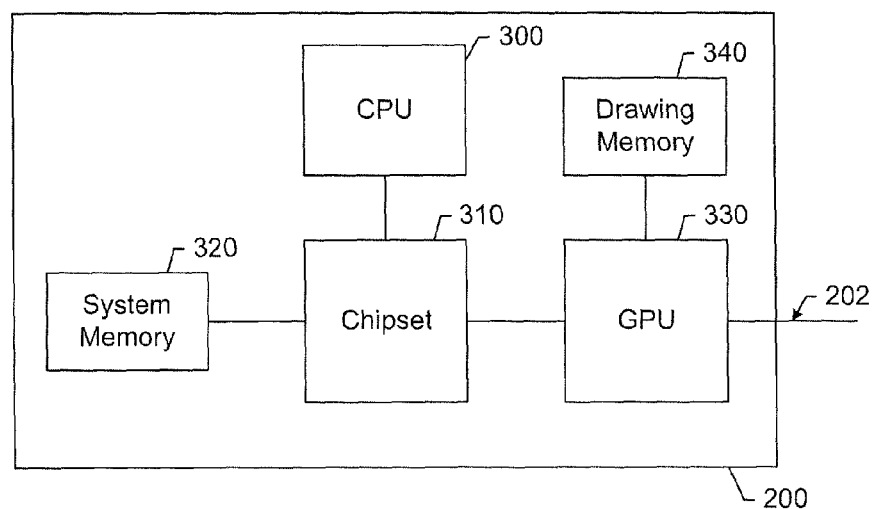
FIG. 3 shows an embodiment of an image source comprising central and graphics processing units.

FIG. 3 shows an embodiment of image source 200 introduced in FIG. 2. In the embodiment shown, central processing unit (CPU) 300 is connected by chipset 310 to system memory 320 and graphics processing unit (GPU) 330. GPU 330 is further connected to drawing memory 340 in the embodiment shown. Other components including mass storage, network interface and other I/O components known to the art may be present but are not shown for simplicity.

Examples of a suitable CPU include 32-bit, 64-bit or other CPUs such as Opteron or Athlone class microprocessors manufactured by AMD, Xeon, Pentium or X86 class processors manufactured by Intel, Inc., SPARC microprocessors manufactured by Sun Microsystems Inc. Or microprocessor such as a PowerPC processor manufactured by Motorola, Inc. However, any other suitable microprocessor may be utilized. In an alternative embodiment, image source 120 comprises multiple CPUs connected by a suitable communications fabric such as HyperTransport™, Infiniband™ or RapidIO™.

In the described embodiment, system memory 320 comprises any one or combination of volatile computer readable media (e.g., RAM such as DRAM, SRAM, etc.) and nonvolatile computer readable media (e.g., ROM, hard drive, tape, CDROM, DVDROM, magneto-optical disks, EPROM, EEPROM, Flash EPROM etc.). Moreover, system memory 210 may incorporate electronic, magnetic, optical, and/or other types of storage media. Note that system memory 320 is globally distributed in some embodiments.

The embodiment in FIG. 3 includes software for controlling CPU 300, GPU 330 and other components active in generating composite images. In an embodiment, software is stored on any one or on a combination of computer readable media associated with system memory 320. The software in memory 320 may include one or more separate programs, each of which comprises an ordered listing of executable instructions for implementing logical functions. Such software may include, but is not limited to, device drivers, operating systems and user applications. A non-exhaustive list of examples of suitable commercially available operating systems includes any Windows operating system from Microsoft, Inc. such as Windows® XP or Windows Vista™, any LINUX® operating system available from many vendors or a UNIX® operating system, also available from many vendors including Hewlett-Packard, Inc. or Sun Microsystems, Inc. The operating system essentially controls the execution of other computer programs, and provides scheduling, input-output control, file and data management, memory management, and communication control and related services.

In an embodiment, GPU 330 operates in association with drawing memory 340 to generate display images on bus 202 using graphic processing methods known to the art. Suitable GPUs include the Radeon™ family manufactured by ATI, the GeForce™ family manufactured by nVidia, S3 processors from VIA Technologies or others. In an embodiment, drawing memory 340 is partitioned into vertex and frame buffer partitions and the frame buffer partition is accessible by encoder 210 in FIG. 2. In another embodiment, GPU 330 and encoder 210 in FIG. 2 share system memory 320 with CPU 300 and drawing memory 340 is not present. In another embodiment, neither GPU 330 nor memory 340 is present. Rather, 2D or 3D graphics processing functions such as DirectX® or OpenGL® processing functions are integrated with other components, for example in chipset 310 or CPU 300.

In an embodiment, chipset 310 is also communicatively coupled with a network interface such as a network interface card (NIC). Image encoder 210 (in FIG. 2) then connects with external components such as remote computer 120 (in FIG. 1) or storage components using the NIC rather than communication interface 230 in FIG. 2.

In an alternative embodiment, encoder 210 (in FIG. 2) is integrated with image source 200, for example as a logic circuit in GPU 330 or chipset 310. In another alternative embodiment, encoder 210 (in FIG. 2) is implemented as a software program stored in system memory 320 that is executed by the CPU. In a software embodiment of encoder 230, system memory 320 may be shared between encoding and other CPU processing functions.

Figure 4:
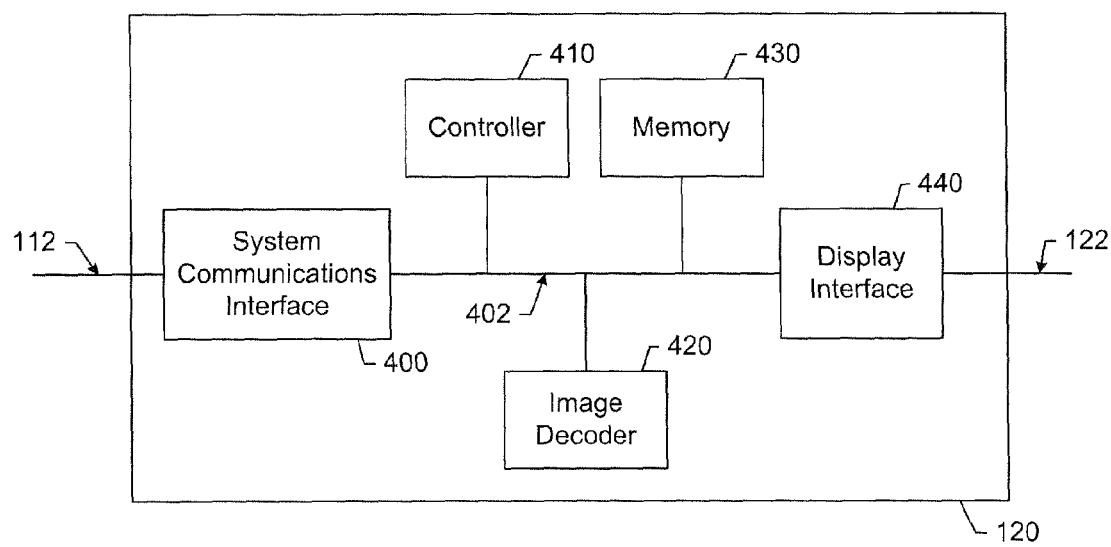
FIG. 4 illustrates an embodiment of a remote computer system suitable for decoding transformed images.

FIG. 4 illustrates an embodiment of remote computer system 120 in FIG. 1. In an embodiment, system 120 is implemented as a stand-alone desktop appliance such as a thin client or desktop computer. In a stand-alone embodiment, system 120 also comprises mechanical housing components, connectors, power supplies, peripheral devices such as human interface devices (HID) and other components not shown in FIG. 4 as not to unnecessarily obscure aspects of the present invention. In another embodiment, system 120 is a processing module integrated in an appliance such as a phone or display. In such an embodiment, system 120 may be configured to use resources such as power supply and mechanical support components provided by the appliance.

Referring to the embodiment in FIG. 4, system 120 comprises system communications interface 400, control processor 410, image decoder 420, memory 430 and display interface 440 communicatively coupled by local bus 302. Bus 302 can be, for example but not limited to, one or more buses such as an AMBA bus or other wired connections, as is known in the art. Bus 440 may have additional elements, such as controllers, data buffers, drivers, repeaters, and receivers, to enable communications but are omitted from FIG. 4 for simplicity. Further, bus 440 may include address, control, and/or data connections to enable appropriate communications among the aforementioned components.

In an embodiment, interface 400 is a network interface that provides communicative coupling between remote computer system 120 and network 110 in FIG. 1. At a low communications level, interface 400 sends and receives electrical, electromagnetic or optical signals that carry digital data streams representing various types of information. In an embodiment, interface 400 supports a TCP/IP protocol stack for network communications.

Controller 410 provides control and management functions for computer 120. In an ASIC or FPGA embodiment of computer 120, processor 410 is a suitable embedded processor such as a MIPS, ARM or other suitable embedded microprocessor known to the art. In a discrete embodiment of computer 120, controller 410 is any suitable microcontroller or microprocessor known to the art such as microcontroller or microprocessor products manufactured by Intel, Motorola, Microchip or other manufacturers. In an embodiment, controller 410 initializes local bus 402, interface 400, decoder 420, memory 430, interface 440 and other components if present. In an embodiment, controller 410 also establishes a management connection with host computer system 100 to enable communication of status updates, error conditions and image control information.

Figure 6:
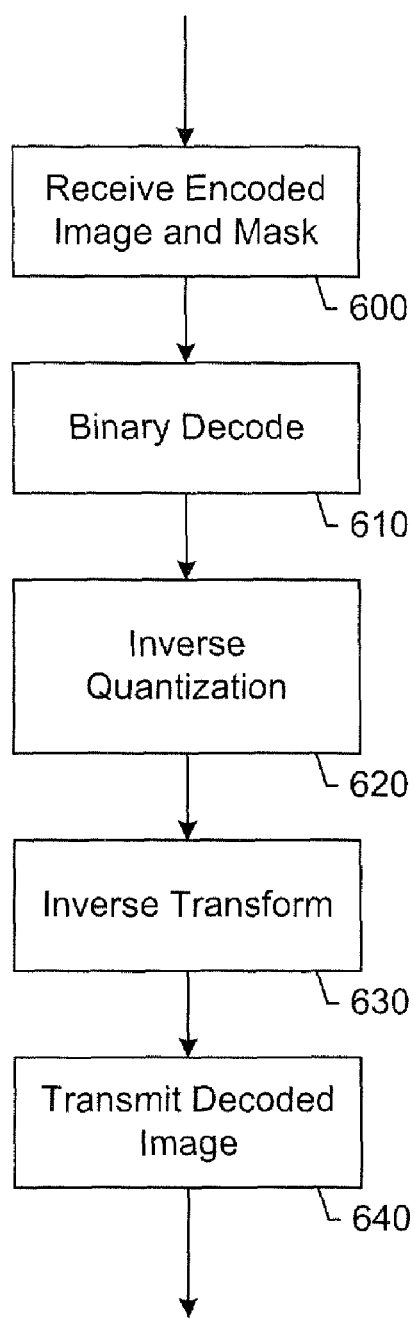
FIG. 6 shows an embodiment of a method for decoding and displaying composite images using inverse wavelet transforms applied to partially masked images.

Image decoder 420 executes image-decoding operations such as binary decoding, inverse quantization and inverse transform operations described herein and illustrated in FIG. 6. In an embodiment, decoder 420 is implemented using a programmable embedded processor such as a TMS320DM64x DaVinci digital media processor available from Texas Instruments, a PNX1300 Nexperia processor from Philips, or other functionally similar processor suitable for performing the decoding methods described herein and illustrated in FIG. 6. In another embodiment, the encoding methods described herein and illustrated in FIG. 6 are implemented as logic circuits embedded in an FPGA or ASIC.

In an embodiment, memory 430 includes RAM to support information such as inbound image and mask information, decoded image information, information associated with controller 410 and decoded raster image information in a format accessible to display interface 440. In an embodiment, memory 430 is partitioned and distributed using different buses for optimum coupling with interface 400, decoder 420 and interface 440. In another embodiment, memory 440 also includes Read Only Memory (ROM) for firmware storage.

Display interface 440 accesses display information from memory 430 and delivers a display signal such as a raster signal on connection 122. In a DVI embodiment of connection 122, interface 440 comprises line driver circuitry such as transition-minimized differential-signaling (TMDS) link output known to the art. In a VGA embodiment of connection 122, interface 440 is a VGA controller. In an embodiment where system 120 is implemented as a programmable media processor such as one of the processors described above, on-board processor resources may be to implement the functions of interface 400, decoder 420, and interface 440.

Remote computer system 120 described above is for purposes of example only. An embodiment of the invention may be implemented in any type of computer system or programming or processing environment suited to receiving and decoding one or more composite image streams. Furthermore, system 120 may include HID devices and other peripheral components such as microphone or speakers omitted from FIG. 4 so as not to obscure the present invention.

FIG. 5 shows an embodiment of a method for encoding and transmitting composite images using partially masked wavelet transforms. In one embodiment, encoding steps are performed by image encoder 210 shown in FIG. 2. In another embodiment, at least some encoding steps are performed by CPU 300, GPU 330 or chipset 310 (all referenced in FIG. 3), either as instructions executed by CPU 300 or GPU 330 or as logic functions executed by other circuits. In an embodiment, steps such as image type decomposition, quantization, binary encoding and network communications use methods known to the art and are therefore not described in unnecessary detail as not to obscure inventive aspects of the embodiment shown.

As a first step 500, a source image is received. In one embodiment, an image block of 16×16 non-overlapping pixels is retrieved from a frame buffer in system memory 320 (ref. FIG. 3) or drawing memory 340 (ref. FIG. 3). In other embodiments, other block sizes are used. In another embodiment, a video signal such as a DVI signal is captured in a buffer such as encoder memory 220 (ref. FIG. 2) and partitioned into suitable sized image blocks such as blocks of 16×16 pixels.

As a next step 510, the image retrieved in step 500 is decomposed based on image type or pixel status information. In an embodiment, encoder 210 in FIG. 2 generates a multi-layer mask in which each layer of the mask describes a different image types such as background, text, picture or object layers based on spatial and temporal features such as contrast, color and other attributes of the content. In an embodiment, image type is determined using image analysis methods known to the art such as text and object recognition filters. In another embodiment, image type is at least partially determined by interpreting drawing commands intercepted from CPU 300 or GPU 320 in FIG. 3. Drawing commands provide attributes that enable areas to be classified as video, text, background, icons, photographs or other elements typical of a graphic user interface. In an embodiment, each layer of the mask is a binary map corresponding to the underlying input image wherein areas of the input image not associated with the layer type are reflected as zero values in the mask. In an embodiment, the multi-layer mask is stored in encoder memory 220.

As a next step 520, the masked image is transformed using the masked transform methods described later in FIG. 7. In one embodiment, essentially all image blocks and the image mask is transformed by encoder 210 using the methods described herein and illustrated in FIG. 7. In another embodiment, unmasked blocks are transformed using existing wavelet or other transform methods known to the art. In another embodiment, only areas of the image that have changed subsequent to a previous encoding as indicated by a mask are encoded.

As a next step 530, the transformed image is quantized. In an embodiment, step 530 reduces the precision of wavelet coefficients by dividing coefficient magnitudes by a quantization factor and rounding down the result. Quantization methods are known to the art and described elsewhere.

As a next step 540, the quantized image is subjected to binary encoding such as entropy arithmetic encoding or an alternative suitable lossless data compression method. Binary encoding methods are known to the art and described elsewhere.

As a next step 550, the encoded image data and transformed mask is transmitted. In an embodiment, interface 230 (in FIG. 2) transmits the encoded image and mask over network 110 to system 120 (in FIG. 1). In another embodiment, the encoded image data and transformed mask is stored on a suitable mass storage medium such as a disk array.

FIG. 6 shows an embodiment of a method for decoding and displaying a composite image using inverse wavelet transforms applied to partially masked images. In an embodiment, decoding steps are performed by image decoder 420 shown in FIG. 4. In another embodiment, at least some decoding steps are performed by processor 410 in FIG. 4. In the embodiment described herein and illustrated in FIG. 6, steps such as binary decoding, inverse quantization and image display use methods known to the art and are therefore not described in unnecessary detail as not to obscure inventive aspects of the embodiment shown.

As a first step 600, encoded image data and transformed mask information is received. In an embodiment, interface 400 of remote computer 120 in FIG. 4 receives image and transformed mask information over connection 112 and stores the data in memory 430 for access by decoder 420 (all referenced in FIG. 4).

As a next step 610, the image data is subjected to binary decoding. In an embodiment, the decoding step is complementary to binary encoding step 540 in FIG. 5. Binary decoding methods are known to the art and described elsewhere.

As a next step 620, the decoded image undergoes inverse quantization to reproduce coefficients computed by encoder 210 in FIG. 2. In an embodiment, an inverse quantization algorithm scales quantized coefficients by weighting values to reconstruct a set of approximate coefficient values using prior art methods.

As a next step 630, recovered image coefficients and transformed mask are processed by an inverse transform to reproduce an image for display. An embodiment of an inverse transform method is described herein and illustrated in FIG. 10.

As a next step 640, the decoded image is transmitted. In an embodiment, the image recovered in step 630 is retrieved from memory 430 in FIG. 4 by display interface 440 in FIG. 4 and transmitted to display 130 in FIG. 1 for display.

Figure 7:
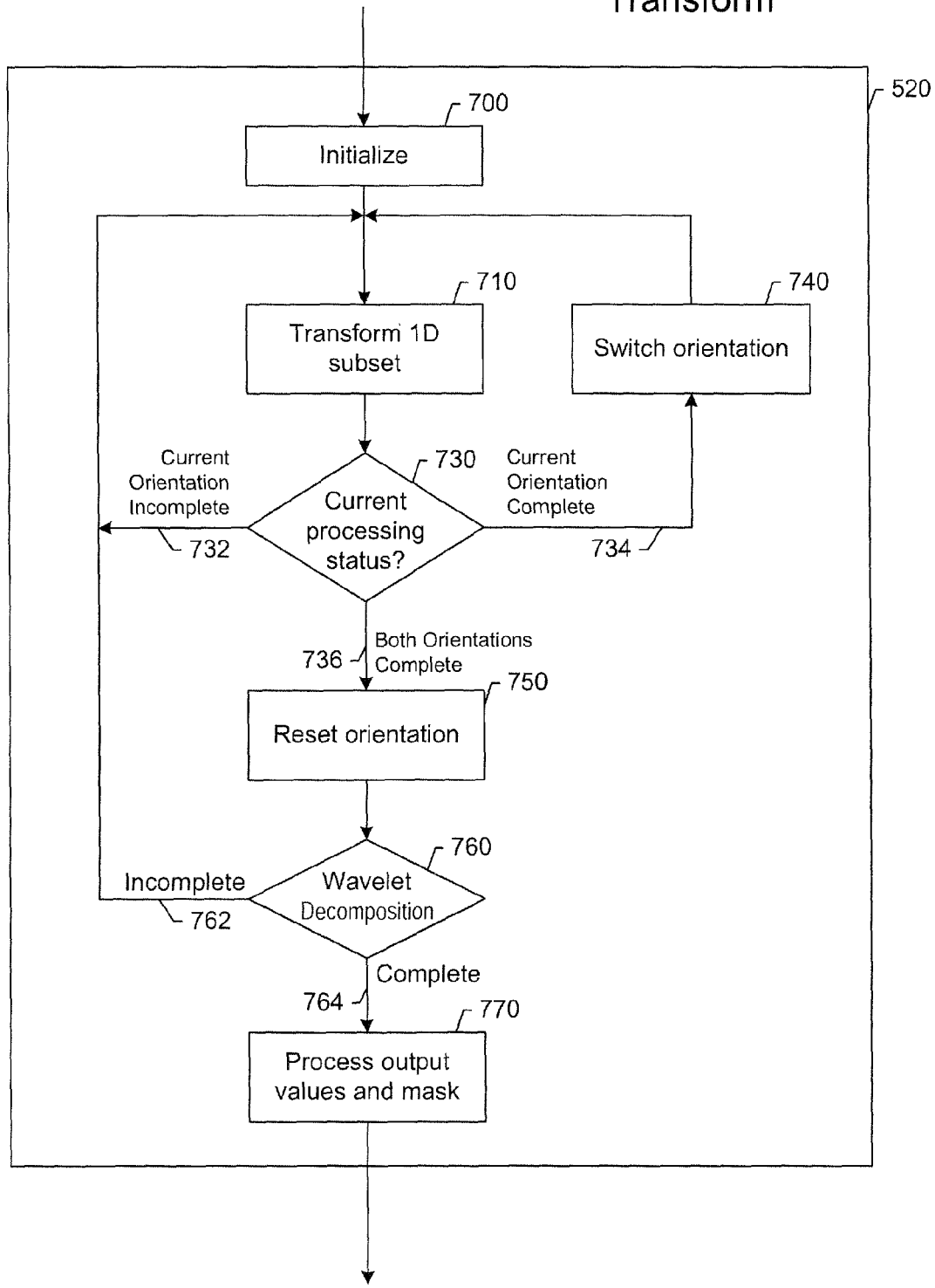
FIG. 7 shows an embodiment of a transform step.

FIG. 7 shows an embodiment of step 520 in FIG. 5. As a first step 700, an image transform computation is initialized. In an embodiment, data structures are allocated to store input pixel and mask data, output values and intermediate values such as filter weights. In another embodiment, initialization step 700 includes operations such as loading the input pixel block into an input array. In an embodiment, the input block is a block of 16×16 pixels. Other embodiments process different block sizes. In an embodiment, the input array is subjected to DC level shifting using methods known to the art in preparation for image transform.

As a next step 710, a subset of the input array transformed. In an embodiment that uses a Finite Impulse Response (FIR) filter, step 710 generates a low-pass output value or a high-pass output value from a set of input values in a given processing orientation dependent on whether the output has an odd or even index (where the index describes the absolute offset of the FIR output value in the determined processing orientation, for example the row offset in the vertical processing orientation). In other embodiments, the wavelet lifting transform method is used as an alternative to FIR processing to enable in-place computation of a set of wavelet output values on each repetition of step 710. A FIR processing embodiment of step 710 is disclosed in FIG. 8.

As a next step 730, the processing status of the current transform is checked. In case 732, additional values in the current horizontal or vertical orientation require transformation so step 710 is repeated for the next input values in the current processing orientation. For example, in a FIR processing embodiment where processing is occurring in a horizontal orientation, the next unmasked focus pixel in the row is selected and the set of input values associated with the newly selected focus pixel. If the row has been processed to completion, the first unmasked pixel in the next row is selected as the next focus pixel. In the case where processing is occurring in a vertical orientation, the next unmasked pixel in the column is processed and if the column has been processed to completion, the first unmasked pixel in the next column is selected. In case 734, the current orientation is complete so the processing orientation is switched as next step 740. In an embodiment where horizontal processing is done first, vertical processing commences and in an embodiment where vertical processing is done first, horizontal processing commences. In an embodiment, the mask associated with the transformed layer is stored so that it does not require regeneration by a remote system. In case 736, both orientations have been processed so the processing orientation is reset as next step 750.

In an embodiment, the first processing orientation selected for processing the first sub-band is again selected for processing the next sub-band. In one embodiment, high pass output values are disabled to ensure exclusion from further processing in the next level of decomposition. In another embodiment, a sequencer is configured to automatically select pixels based on the current level of wavelet decomposition. For example, in an embodiment with four levels of wavelet decomposition, every 2nd pixel is selected during the second level of decomposition, every 4th pixel is selected during the third level of decomposition and every 8th pixel is selected during a final forth level of decomposition, As a next step 760, the completion status of the transform is checked once both orientations have been processed to determine if the specified number of wavelet decomposition levels have been computed. In one embodiment that transforms a block of 16×16 input values, the block is decomposed into four sub-bands so the transform is complete after both orientations have been processed four times. In other embodiments, a different number of sub-bands are used. In case 762, the specified level of wavelet composition has not yet been reached so processing of the next sub-band commences with step 710. In case 764, the transform is completed to the specified level of wavelet decomposition so the output values and mask are processed as a next step 770.

In one embodiment of step 770, the output values are stored in memory in preparation for encoding and the mask is encoded using binary encoding methods known to the art. In an embodiment, the mask is temporarily stored prior to transmission to the remote computer system.

Figure 8:
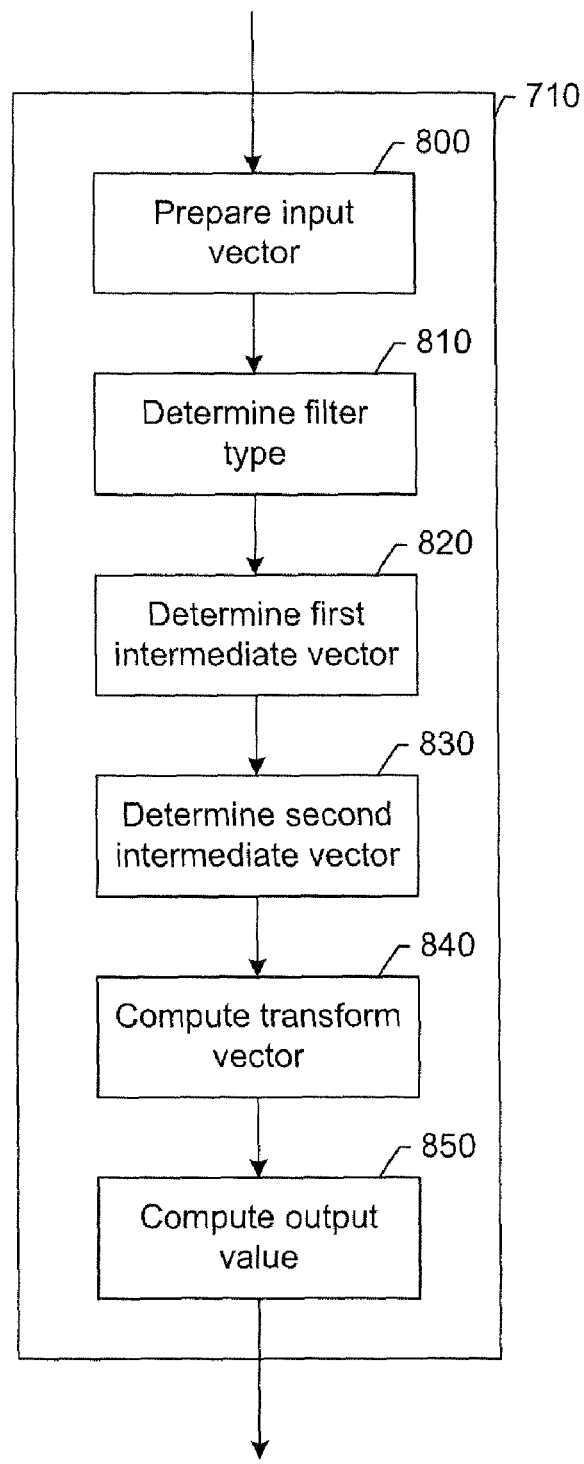
FIG. 8 shows an embodiment a single dimension subset transform in which a an output value is computed from a set of input values and associated mask information in a given processing orientation.

FIG. 8 shows an embodiment of step 710 in FIG. 7 in which a FIR filter computes an output value from a set of input values and associated mask information in a given processing orientation.

As a first step 800, an input vector is selected and prepared for transform. In a FIR embodiment with an odd tap length, the next set of input values associated with the next output in the current processing orientation are selected as the next input vector.

For example, if a FIR filter is 2K+1 taps in length, the next vertical input vector [$u_{x,y-K}$ ... $U_{x,y+K}$] is selected for the next input value $u_{x,y}$ in a vertical processing orientation, where x and y respectively reference the horizontal and vertical co-ordinates of an input value in an input block of dimension X and Y. In an embodiment using an FIR processing sequencer, such as the 5 tap filter embodiment shown in FIG. 9, the current input vector is shifted one position to the right and the next input value in the input array is copied to the first location in the input vector in preparation for transform.

In an alternative embodiment of step 800, the input vector and mask are shuffled prior to transform. Shuffling prevents an unmasked value from stagnating as a high frequency coefficient when a neighboring input value (otherwise designated to become a low frequency wavelet coefficient at the next decomposition level) is masked. Shuffling thereby preserves the low frequency contribution made by the unmasked input value to the next level of decomposition. In an embodiment where shuffling is implemented, the input vector is scanned prior to performing a low frequency transform operation. If the focus input value ux,y is masked and a neighboring value (for example ux,y−1 or ux,y+1 is unmasked in the case of a vertical transform or ux−1,y or ux+1,y is unmasked in the case of a horizontal transform), ux,y is swapped with the unmasked neighbor. The mask is also shuffled to reflect the change so that a decoder can detect the shuffle. In one embodiment of a shuffled transform, shuffling is alternated between left and right shuffles to prevent low frequency bias caused by unmasked coefficients drifting in a single predominant direction. In the case of a shuffled transform, the shuffled mask associated with each wavelet decomposition level and processing orientation is transmitted to the remote system. In an embodiment, each mask layer is temporarily stored by encoder 210 (in FIG. 2) as part of step 740 (in FIG. 7) prior to proceeding with the next orientation of the transform. A remote system reverses the shuffle by comparing adjacent mask layers prior to performing an inverse transform. An embodiment of an inverse transform of a shuffled data set is described herein and illustrated in FIG. 10.

As a next step 810, the filter type is determined. In one FIR embodiment, the transform alternates between a high-pass filter function and a low-pass filter function based on whether the current input value ux,y (or corresponding output value) has an odd or even index. If the current processing orientation is vertical, an even index value 'y' commands a low pass filter and an odd index value 'y' commands a high pass filter. If the current processing orientation is horizontal, the 'x' index value is evaluated and the filter type determined in a similar way.

As a next step 820, a first intermediate transform weight vector is determined by processing the input vector selected in step 810 and corresponding input mask in a pre-determined direction from the current focus input value ux,y. If the current processing orientation is horizontal, the input vector [ux−K,y . . . Ux+K,y] is analyzed from ux,y in the direction towards u0,y and the number of sequential unmasked values from (and including) ux,y is recorded, where the maximum number of sequential horizontal values is K+1 for an input vector of length 2K+1 as described in step 800. If the current processing orientation is vertical, the input vector [ux,y−K . . . Ux,y+K] is analyzed from ux,y in the direction towards ux,0 and the number of sequential unmasked values from (and including) ux,y is recorded, where the maximum number of sequential vertical values is K+1 for an input vector of length 2K+1 as described.

A first intermediate transform weight vector for the low-pass or high-pass filter is then computed based on the number of sequential values recorded. In an embodiment, a set of bi-orthogonal wavelet bases such Haar, Le Gall 5/3 or Daubechies 9/7 is used. Table 1 presents multiple sets of low-pass weight values for intermediate transform weight vector [a0 . . . a2]. In other embodiments, intermediate transform weight vector [a0 . . . aK] has dimension K corresponding with a FIR filter length of 2K+1. In one K=2 embodiment, each set of weight values related to each number of sequentially unmasked values is associated with a different bi-orthogonal basis function.

TABLE 1

Low Pass Transform Weights for K = 2 Embodiment

| Number of Sequential Unmasked Values | Weight Values | | |
|---|---|---|---|
| | $a_0$ | $a_1$ | $a_2$ |
| 0 | 0 | 0 | 0 |
| 1 | ½ | 0 | 0 |
| 2 | ¼ | ½ | 0 |
| 3 | ⅜ | ¼ | −⅛ |

Note that a0 shown in Table 1 has a value equal to half the value associated with the equivalent basis function because [a0 . . . a2] contributes half the values to the final transform. Note also that values [a0 . . . a2] are set to zero when the focus input value ux,y is masked which ensures a null output value.

Table 2 presents multiple sets of high pass weight values for intermediate transform weight vector [a0 . . . A1] for an embodiment where a 3 tap high-pass filter is implemented (for example in a Le Gall 5/3 embodiment with K=2). In other embodiments, intermediate transform weight vector [a0 . . . AK] has a different dimension K corresponding with a different filter tap length. As for the high-pass filter described, each set of weight values for each number of sequentially unmasked values is associated with a different bi-orthogonal basis function.

TABLE 2

High Pass Transform Weights for K = 2 Embodiment

| Number of Sequential Unmasked Values | Weight Values | |
|---|---|---|
| | $a_0$ | $a_1$ |
| 0 | 0 | 0 |
| 1 | ½ | 0 |
| 2 | ½ | −½ |

Note that a0 in Table 2 also has a value equal to half the value associated with the equivalent basis function because [a0 . . . A1] contributes half the values to the final transform as before.

In an embodiment, the weight values [a0 . . . A2] or [a0 . . . A1] shown in Table 1 and Table 2 are retrieved from a look-up table associated with the filter type using the number of sequential unmasked values recorded as the lookup table index.

As a next step 830, a second intermediate transform weight vector is determined by processing the input vector selected in step 810 and corresponding input mask in the opposite direction to the direction selected for step 820. If the current processing orientation is horizontal, the input vector is analyzed from ux,y in the direction towards uX,y and the number of sequential unmasked values from (and including) ux,y is recorded, where the maximum number of sequential horizontal values is K+1 for an input vector of length 2K+1 as described. If the current processing orientation is vertical, the input vector is analyzed from ux,y in the direction towards ux,Y and the number of sequential unmasked values from (and including) ux,y is recorded, where the maximum number of sequential vertical values is K+1 for an input vector of length 2K+1 as described. X and Y are the dimensions of the image block as previously defined.

The second intermediate transform weight vector [b0 . . . BK] associated with the high-pass or low-pass filter is then computed based on the number of sequential values recorded in the second direction. In a 5 tap filter embodiment with K=2 using substantially similar methods to those described for step 820, low-pass weight values [b0 ... B2] are loaded into a second intermediate transform weight vector in preparation for a low-pass transform or high-pass weight values [b0 ... B1] are loaded in preparation for a high-pass transform. In an embodiment, transform weights are retrieved from lookup tables comprising the weight values in Table 1 and Table 2. In an embodiment, values in the second intermediate transform weight vector are set to zero when the focus input value ux,y is masked to ensure a null output as before.

As a next step 840, a composite transform weight vector is computed by summing the transform weight vectors determined in steps 820 and 830. The two intermediate transform weight vectors are aligned at the index location ux,y, zero padded and summed. An example of a vertical summation is shown in Table 3 below. Composite transform weight vector [w−K ... WK] is computed by summing [a0 ... AK] which represents the first intermediate transform weight vector determined in step 820 and [b0 ... BK] which represents the second intermediate transform weight vector determined in step 830.

TABLE 3

Composite Transform Vector Calculation

|  | $u_{x,y-K}$ | ... | $u_{x,y-1}$ | $u_{x,y}$ | $u_{x,y+1}$ | ... | $u_{x,y+K}$ |
|---|---|---|---|---|---|---|---|
| First intermediate weight vector | z | ... | z | $a_0$ | $a_1$ | ... | $a_K$ |
| Second intermediate weight vector | $b_K$ | ... | $b_1$ | $b_0$ | z | ... | z |
| Composite transform vector | $w_{-K}$ | ... | $w_{-1}$ | $w_0$ | $w_1$ | ... | $w_K$ | where $$z=0 \text{ (zero-padding)} \quad (1)$$

$$w0=a0+b0 \quad (2)$$

$$wj=aj(0<j\leq K) \quad (3)$$

$$wj=bj(-K\leq j<0) \quad (4)$$

Note that [a0 ... AK] may be shorter than K+1 in length in which case it is zero padded to position K+1.
Note that [b0 ... BK] may be shorter than K+1 in length in which case it is zero padded to position K+1.
Note that [w−K ... WK] is not necessarily symmetrical about w0.

In an alternative embodiment, composite transform weight vector [w−K ... WK] is determined in a single step from input vector [ux,y−K ... Ux,y+K] or [ux−K,y ... Ux+K,y] rather than evaluating half filters as described in step 820 and step 830. In the alternative embodiment, a lookup table is indexed by all supported combinations of input vectors, including all supported lengths (up to 2K+1) and the position of the focus value for each supported length. The lookup table then returns a composite transform weight vector for each index vector. In an embodiment, the composite transform weight vectors has substantially similar values to the composite transform weight vectors computed in step 840.

As a next step 850, an output value is computed. In one FIR embodiment, the set of input values [ux,y−K ... Ux,y+K] is convolved with composite transform weight vector [w−K ... WK] constructed in step 840 using inner product multiplication methods known to the art. In one embodiment, the transform is computed using a 5-stage FIR filter shown in FIG. 9 but the present invention is suited to other longer and shorter filters, constrained only by practicalities such as desired processing throughput and availability of processing resources including multiplication logic and memory.

Figure 9:
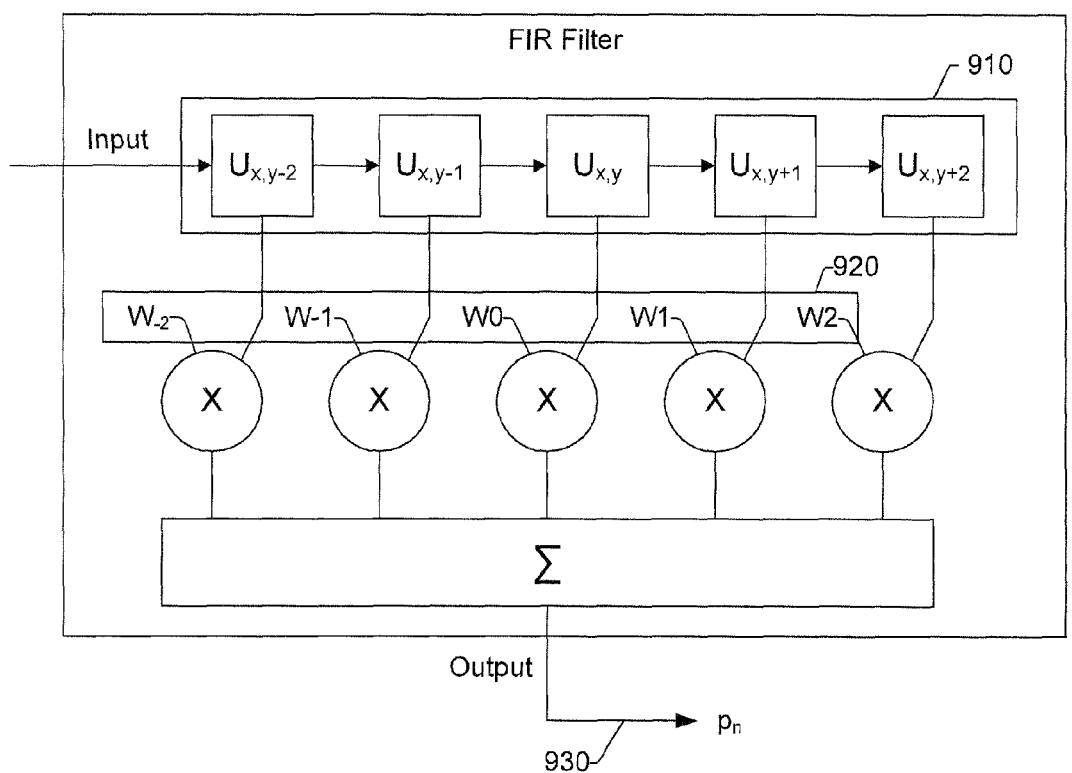
FIG. 9 shows an embodiment of a five-stage FIR filter used to perform a one-dimensional subset transform.

FIG. 9 shows an embodiment of a five-stage FIR filter used to perform a one-dimensional sub-transform (ref. Step 710 in FIG. 7). In an embodiment, filter 900 is implemented using filter logic circuitry known to the art. In another embodiment, filter 900 is implemented in software.

In an embodiment, filter 900 is pre-loaded with input vector 910 (for example vector [ux,y−2 ... Ux,y+2]). In the case of even-indexed ux,y, composite transform vector 920 (for example vector [w−2 ... W2] in Table 3) computed in step 840 of FIG. 8 has low-pass characteristics and nth output value pn (ref. 930) is a low-pass wavelet coefficient. In the case of odd-indexed ux,y, composite transform vector 920 has high-pass characteristics and nth output value pn (ref. 930) is a high-pass wavelet coefficient.

In a five-stage embodiment, the nth wavelet coefficient pn is calculated by filter 900 using the formulae:

$$pn=-w-2ux,y-2+w-1ux,y-1+w0ux,y+w1ux,y+1-w2ux,y+2 \text{ if } n \text{ is even} \quad (5)$$

$$pn=-w-1ux,y-1+w0ux,y-w1ux,y+1 \text{ if } n \text{ is odd} \quad (6)$$

Filter 900 described above is for purposes of example only. An embodiment of the invention may be implemented using any type of computer system or programming or processing environment suited to FIR transforms.

Figure 10:
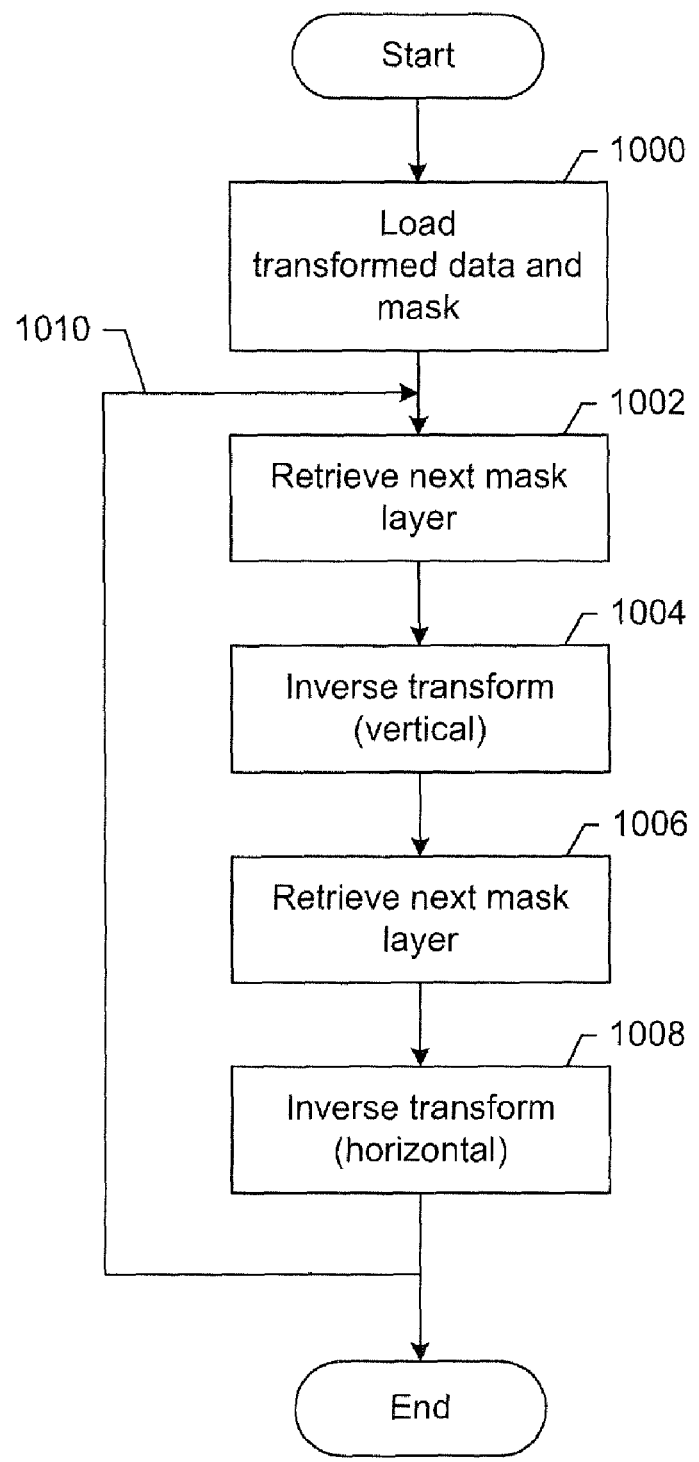
FIG. 10 is a flowchart of an inverse masked transform method.

FIG. 10 shows an embodiment of an inverse transform. As a first step 1000, the transformed data set [p0,0 ... pX,Y] in the wavelet domain and associated mask [m0,0,0 ... mX,Y,N] are loaded into memory of a processing system, such as memory 430 of remote computer system 120 shown in FIG. 4. X and Y represent the horizontal and vertical dimensions of the transformed block. The number of levels of wavelet decomposition are represented by N/2 where each decomposition level has a horizontal and a vertical mask layer. In one embodiment, wavelet data set [p0,0 ... uX,Y] is shuffled as described in step 800 in FIG. 8. In another embodiment, wavelet data set [p0,0 ... uX,Y] is un-shuffled. The method shown in FIG. 10 has advanced knowledge of whether the wavelet data set [p0,0 ... uX,Y] is shuffled or un-shuffled and the shuffling sequence (right-shuffled, left shuffled or alternating shuffle) in the case of a shuffled data set.

As a next step 1002, the previous vertical mask layer is retrieved ahead of the inverse transform and inspected to establish the number of sequentially unmasked values associated with each inverse transform so that the appropriate inverse weight values are applied to the inverse transform. (reference Table 1 and Table 2 in FIG. 8). In an embodiment that uses shuffling, the locations of shuffled wavelet data is also identified by comparing adjacent mask layers.

As a next step 1004, an inverse vertical masked transform is executed on each column of the wavelet data set using the weight values determined in step 1002. If wavelet data is shuffled, the data is re-shuffled to match to the original ordering rather than undergoing an inverse transform.

As a next step 1006, the previous horizontal mask layer is retrieved ahead of the inverse transform and inspected to establish the number of sequentially unmasked values associated with each inverse transform so that the appropriate inverse weight values are applied to the inverse transform (reference Table 1 and Table 2 in FIG. 8). In an embodiment that uses shuffling, the locations of shuffled wavelet data are also identified by comparing adjacent mask layers.

As a next step 1008, an inverse horizontal transform is executed on each column of the wavelet data set using the weight values determined in step 1002. If wavelet data is shuffled, the data is re-shuffled to match to the original ordering rather than undergoing an inverse transform.

As a next sequence of steps 1010, the inverse transform is repeated to completion. In an embodiment that performs all forward horizontal transforms followed by all forward vertical transforms, the inverse transformation is comprised of a sequence of inverse vertical transforms followed by a sequence of inverse horizontal transforms.

The several embodiments described herein are solely for the purpose of illustration. Persons skilled in the art will recognize from this description other embodiments may be practiced with modifications and alterations limited only by the claims.

What is claimed is:

1. A method of executing a wavelet transform on masked data, the method executed under the control of a processor configured with computer executable instructions, the method comprising:
    shuffling, by a system having one or more processors, an unmasked indication associated with a focus input value of a high-pass wavelet filter, to a location in a wavelet filter output mask layer associated with a result of a low-pass wavelet filter; and
    encoding, by the system, mask information of the masked data and quantized unmasked results of the wavelet transform.

2. The method of claim 1, wherein the mask information comprises an initial mask.

3. The method of claim 1, wherein:
    a data value of the masked data initially associated with a focus value of the low-pass wavelet filter is initially masked; and
    an output of the encoding the quantized unmasked results of the wavelet transform is independent of the data value.

4. The method of claim 1, wherein as a consequence of repeated shuffling operations, each unmasked data value of the masked data contributes to a final level wavelet decomposition low-pass filter result.

5. The method of claim 1, further comprising constructing, by the system, a weight vector for a decomposition filter in the wavelet transform by assembling two partial weight vectors, each of the two partial weight vector determined by a different portion of an input vector mask of the decomposition filter.

6. The method of claim 1, wherein the shuffling comprises exchanging the unmasked indication and a first data value associated with the focus input value of the high-pass wavelet filter with a masked indication and a second data value associated with a focus value of the low-pass wavelet filter.

7. The method of claim 1, further comprising repeating, by the system, the shuffling in combination with wavelet filtering until the wavelet transform is complete.

8. The method of claim 1, wherein the shuffling comprises masking a result of the high-pass wavelet filter, the high-pass wavelet filter associated with an unmasked focus input value, in combination with unmasking the result of the low-pass wavelet filter, the low-pass wavelet filter associated with a masked focus input value.

9. A method of decoding wavelet transformed masked data, the method executed under the control of a processor configured with computer executable instructions, the method comprising:
    decoding, by a system having one or more processors, the wavelet transformed masked data to generate wavelet coefficients and mask information;
    determining, by the system, from the mask information, a set of mask layers and a set of associated shuffling operations, each of the set of mask layers associated with a level of wavelet transformation;
    arranging, by the system, the wavelet coefficients based on the set of mask layers;
    inverse wavelet transforming, by the system, each layer of the wavelet coefficients to generate layers of wavelet coefficients;
    shuffling, by the system, each layer of the layers of wavelet coefficients based on the set of mask layers and the set of associated shuffling operations.

10. The method of claim 9, wherein the mask information comprises a mask identifying a placement of unmasked data values resulting from the decoding the wavelet coefficients.

11. The method of claim 9, wherein one from the set of shuffling operations comprises moving a data value result of an inverse wavelet filter to an adjacent data value location in a layer of the inverse wavelet transforming.

* * * * *